United States Patent
Kasper

(10) Patent No.: US 9,945,426 B2
(45) Date of Patent: Apr. 17, 2018

(54) SHAFT-HUB CONNECTION, ADAPTER AND GEARED MOTOR

(71) Applicant: SEW-EURODRIVE GMBH & CO. KG, Bruchsal (DE)

(72) Inventor: Jürgen Kasper, Lingenfeld (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 815 days.

(21) Appl. No.: 14/372,639

(22) PCT Filed: Nov. 29, 2012

(86) PCT No.: PCT/EP2012/004923
§ 371 (c)(1),
(2) Date: Jul. 16, 2014

(87) PCT Pub. No.: WO2013/107476
PCT Pub. Date: Jul. 25, 2013

(65) Prior Publication Data
US 2015/0300414 A1   Oct. 22, 2015

(30) Foreign Application Priority Data

Jan. 16, 2012   (DE) .................. 10 2012 000 537

(51) Int. Cl.
*F16D 1/092*   (2006.01)
*F16D 1/08*    (2006.01)

(52) U.S. Cl.
CPC ........... *F16D 1/092* (2013.01); *F16D 1/0847* (2013.01)

(58) Field of Classification Search
CPC .......... F16D 1/076; F16D 1/08; F16D 1/0805; F16D 1/0847; F16D 1/0852; F16D 1/0858; F16D 1/087
See application file for complete search history.

(56) References Cited

U.S. PATENT DOCUMENTS 2,432,860 A   12/1947   Clatfelter
2,464,077 A    3/1949   Dicks
(Continued)

FOREIGN PATENT DOCUMENTS

DE         137 669         1/1902
DE   10 2007 043 319      5/2009
(Continued)

OTHER PUBLICATIONS

International Search Report, dated Apr. 3, 2013, issued in corresponding International Application No. PCT/EP2012/004923.

*Primary Examiner* — Jonathan P Masinick
(74) *Attorney, Agent, or Firm* — Andrews Kurth Kenyon LLP

(57) ABSTRACT

A shaft, especially a motor shaft, is inserted into an accommodation area of a hub, especially an adapter shaft, and is connected with force locking, especially being clamped. The hub, at least in one axial area, has three flattenings evenly spaced from one another in the circumferential direction. A first threaded part, particularly a first, preferably radially-acting setscrew, is screwed into a clamping ring and presses on one area of the hub in order to bring about the force-locking connection, especially by bracing the clamping ring against the hub, in particular, the area covering an angle-at-circumference area which is smaller than the angular distance in the circumferential direction between two flattenings immediately adjacent in the circumferential direction.

34 Claims, 7 Drawing Sheets

(56) References Cited

U.S. PATENT DOCUMENTS

| | | | | | |
|---|---|---|---|---|---|
| 2,804,322 | A | * | 8/1957 | Herzog | F16D 1/068 156/293 |
| 3,160,429 | A | * | 12/1964 | Martins | F16D 1/08 403/370 |
| 3,598,432 | A | * | 8/1971 | Walker | F16D 1/0847 403/366 |
| 3,879,046 | A | * | 4/1975 | Alford | B23B 31/208 279/133 |
| 4,006,993 | A | * | 2/1977 | Woerlee | F16D 1/06 403/359.5 |
| 4,657,429 | A | * | 4/1987 | Morris | F16D 1/087 403/354 |
| 2005/0072636 | A1 | * | 4/2005 | Lee | B23B 31/305 188/71.1 |
| 2006/0035746 | A1 | * | 2/2006 | Griggs | F16D 1/0858 475/331 |
| 2012/0076575 | A1 | * | 3/2012 | Smith | B23P 11/00 403/289 |

FOREIGN PATENT DOCUMENTS

| | | | | |
|---|---|---|---|---|
| DE | 102013208568 | * | 11/2014 | F16D 1/0817 |
| GB | 776 357 | | 6/1957 | |
| GB | 798 658 | | 7/1958 | |
| GB | 2 079 695 | | 1/1982 | |
| GB | 2079695 A | * | 1/1982 | B62D 1/185 |
| GB | 2 273 143 | | 6/1994 | |
| WO | WO 0061422 A1 | * | 10/2000 | B62D 1/10 |
| WO | WO 2014187540 A1 | * | 11/2014 | F16D 1/0847 |

* cited by examiner

US 9,945,426 B2

SHAFT-HUB CONNECTION, ADAPTER AND GEARED MOTOR

FIELD OF THE INVENTION

The present invention relates to a shaft/hub connection, an adapter and a geared motor.

BACKGROUND INFORMATION

Adapters for geared motors are known, which include a coupling by which a motor shaft on the input side and an input shaft of a gear unit on the output side are able to be connected.

SUMMARY

Therefore, an object of the present invention is to further develop a clamping connection in a manner easy to manufacture.

Features of the invention with regard to the shaft/hub connection are that in the case of the shaft/hub connection, a shaft, especially a motor shaft, is inserted into an accommodation area of a hub, especially an adapter shaft, and is connected with force-locking, in particular, is clamped, the hub, at least in one axial area, having three flattenings evenly spaced from one another in the circumferential direction, a first threaded part, particularly a first, preferably radially-acting setscrew, being screwed into a clamping ring and pressing on one area of the hub in order to bring about the force-locking connection, especially by bracing of the clamping ring against the hub, in particular, the area covering an angle-at-circumference area which is smaller than the angular distance in the circumferential direction between two flattenings immediately adjacent in the circumferential direction.

The advantage in this context is that an easy and rapidly manipulable connection is achieved. In addition, a centrically-tensioning clamping system is producible in easy manner. The centric clamping of the shaft in the hub is achievable owing to the symmetrical placement of the flattenings.

Advantageously, the shaft/hub device is supportable via the shaft. For example, this shaft is able to be supported in a motor housing via two bearings. In this case, the bearing facing away from the shaft/hub connection may take of the form of an axial fixed bearing, and the bearing facing closer toward the shaft/hub connection may take the form of an axial non-locating bearing. Thus, an angular-position sensor or the like may be disposed on the end of the shaft facing away from the shaft/hub connection. Thermally caused changes in length therefore shift the other axial end of the shaft, and thus the shaft/hub connection, as well. However, since it is supported by the bearing assembly of the shaft, there is no impairment owing to thermally-caused changes in length of the shaft. Particularly given an implementation of the hub with sun toothing, or given connection of the hub to a sun-wheel shaft, the sun-wheel toothing shifts only axially owing to thermal causes, the planet-wheel toothing and sun-wheel toothing being provided with toothings extending axially at least in part.

It is also advantageous that slotted bushings and the like are dispensable. Thus, the invention makes do with extremely inexpensive components.

In one advantageous development, the flattenings are situated on the outer side of the hub facing away from the shaft. This offers the advantage that the hub may be produced easily. In addition, the areas of greater wall thickness are thus distributed uniformly at the circumference.

In one advantageous embodiment, the clamping ring is joined in rotatably fixed manner to the hub, in particular, the flattenings being located between the clamping ring and the hub. This is advantageous because when inserting the shaft, thus, prior in time to the clamping connection, the shaft may be inserted centrically into the hub, and upon clamping, the shaft may then be fixed centrically in position by the three areas of greater wall thickness.

In one advantageous refinement, the area in the circumferential direction is situated centrally between two of the flattenings, in particular, the area being apart from the area covered axially by the flattenings. This offers the advantage that greater wall thickness is realizable there, and in addition, a centric accommodation of the shaft in the hub is attainable.

In one advantageous development, the hub has a greater wall thickness in this area than in the area of a respective flattening. The advantage in this case is that great pressure forces may be introduced into this area, since the wall thickness is sufficient. In the areas having thinner wall thickness as a result of the flattenings, these pressure forces, if introduced, would be destructive, since the wall thickness there would not be adequate for them.

In one advantageous refinement, a further threaded part, especially a setscrew or headless setscrew, or a flattening corresponding to at least one of the flattenings of the hub or a planar inner-wall section corresponding to at least one of the flattenings of the hub is provided on the clamping ring as anti-rotation means, in particular, the anti-rotation means safeguarding against rotation between the clamping ring and the hub, in particular, the anti-rotation means being situated diametrically opposite of the first threaded part, thus, the center of mass of the first and of the further threaded part in particular being 180° away from each other in the circumferential direction, in particular, the further threaded part being adhesively bonded to the clamping ring. This offers the advantage that the further threaded part makes it possible to produce a flattening of the inner wall of the clamping ring without the clamping ring having to be machined in out-of-round fashion. This makes the clamping ring easy to manufacture, and only a round machining is necessary—at least at the inner wall of the clamping ring.

In one advantageous refinement, as anti-rotation means, the clamping ring has a flattening on its inner wall facing the hub, in particular, the flattening which is located on the inner wall of the clamping ring and which touches one of the flattenings of the hub covering especially the same angle at circumference as the flattening of the hub. This is advantageous because no additional means are necessary; rather, the clamping ring has an inner contour which has an anti-rotation means interacting with one of the flattenings.

In one advantageous embodiment, the hub is disposed radially between the shaft and the clamping ring. The advantage here is that the hub is formed with elastically deformable areas.

In one advantageous refinement, the slot area for manipulation' of the first threaded part is implemented differently from the slot area for manipulation of the anti-rotation means, so that a different tool is necessary to manipulate the first threaded part than to manipulate the anti-rotation means, in particular, the first threaded part taking the form of a first setscrew and the anti-rotation means taking the form of a further setscrew. The advantage in this case is that no mistaken manipulation is feasible. In addition, the further threaded part is adhesively bonded, so that a mistaken manipulation is thereby additionally prevented, as well.

In one advantageous embodiment, a retaining ring is disposed on the hub for the axial securing of the clamping ring. This is advantageous in that for transport restraint, the clamping ring is secured axially in position on the shaft.

In one advantageous refinement, the first threaded part is provided in an accommodating housing part, especially an adapter flange, as transport restraint or anti-rotation means of the clamping ring acting, especially acting in restricting fashion, in the circumferential direction. This offers the advantage that during transport or in the warehouse, thus, prior to the connection of the motor or the motor shaft, the first threaded part is usable as anti-rotation means, and upon connection of the motor, is able to be screwed into the clamping ring, so that the protection of the shaft against rotation is neutralized, and the clamping connection is brought about between the hub and the shaft.

In one advantageous development, the hub, together with the clamping ring, is supported via the shaft in a further housing part, especially motor-housing part. This is advantageous because the shaft/hub connection needs no support in a separate housing part, but rather, is able to be supported with the motor shaft via its bearing assembly.

In one advantageous development, the clamping ring is secured in position on the hub by an anti-rotation means in such a way that the first threaded part is pressed against the hub centrally in the circumferential direction between two adjacent flattenings. The advantage in this case is that it is therefore possible to bring about a symmetrical force distribution, since the action of force of the first threaded part may thus be introduced symmetrically between two flattenings and therefore the acting force as well as the associated reaction forces are distributed symmetrically.

In one advantageous development, the clamping ring is slipped onto the hub from the axial direction, so that the hub is able to be clamped onto the shaft, in particular, an axially running slot being provided in one housing part, into which the first threaded part extends at least partially as anti-rotation transport restraint. This is advantageous, because it permits easy manufacture, and at the same time, transport restraint is achieved by the first threaded part in the slot. The reason is that the slot extends axially. Therefore, the threaded part protruding at least partially from the clamping ring limits the rotational movement in the circumferential direction, owing to the first threaded part striking against the wall of the slot.

Important features with regard to the adapter are that it is implemented with an aforementioned shaft/hub connection, the shaft/hub connection being surrounded at least partially by an adapter flange and/or adapter housing part, in particular, the adapter flange having an axially running slot into which the first threaded part extends at least partially to form a transport restraint, and/or a borehole opening through into the slot and a tool being able to be passed through the borehole in order to manipulate, especially to screw, the first threaded part.

This is advantageous because a transport restraint is able to be produced by a connection means, thus, the first threaded part. In addition, the motor housing is connectable to the adapter flange and/or a further adapter housing part. Moreover, a radially running borehole may be provided in the adapter housing part, through which a tool is able to be passed for manipulating the first threaded part, and through which the shaft/hub connection is connectable or releasable. In addition, the gear housing is connectable to the adapter housing part and/or adapter flange. In this way, the housing parts of motor, adapter and gear unit are connectable to each other with the aid of centering. The shaft supported in the gear housing is connectable to the motor shaft with the aid of the shaft/hub connection also acting as coupling.

If the gear unit is implemented as a planetary gear, on one hand, the sun-wheel toothing connected to the hub, thus adapter shaft, is supportable via the planets, and on the other hand, the driving motor shaft itself, accommodated in the hub, is supportable via bearings in the motor.

Important features with regard to the geared motor are that it includes an aforementioned adapter. The advantage in this context is that with the aid of the adapter including the shaft/hub connection, a coupling is able to be produced between the motor shaft and the input gear shaft, especially the shaft connected to the hub and having sun-wheel toothing, or the hub.

DETAILED DESCRIPTION

Figure 1:
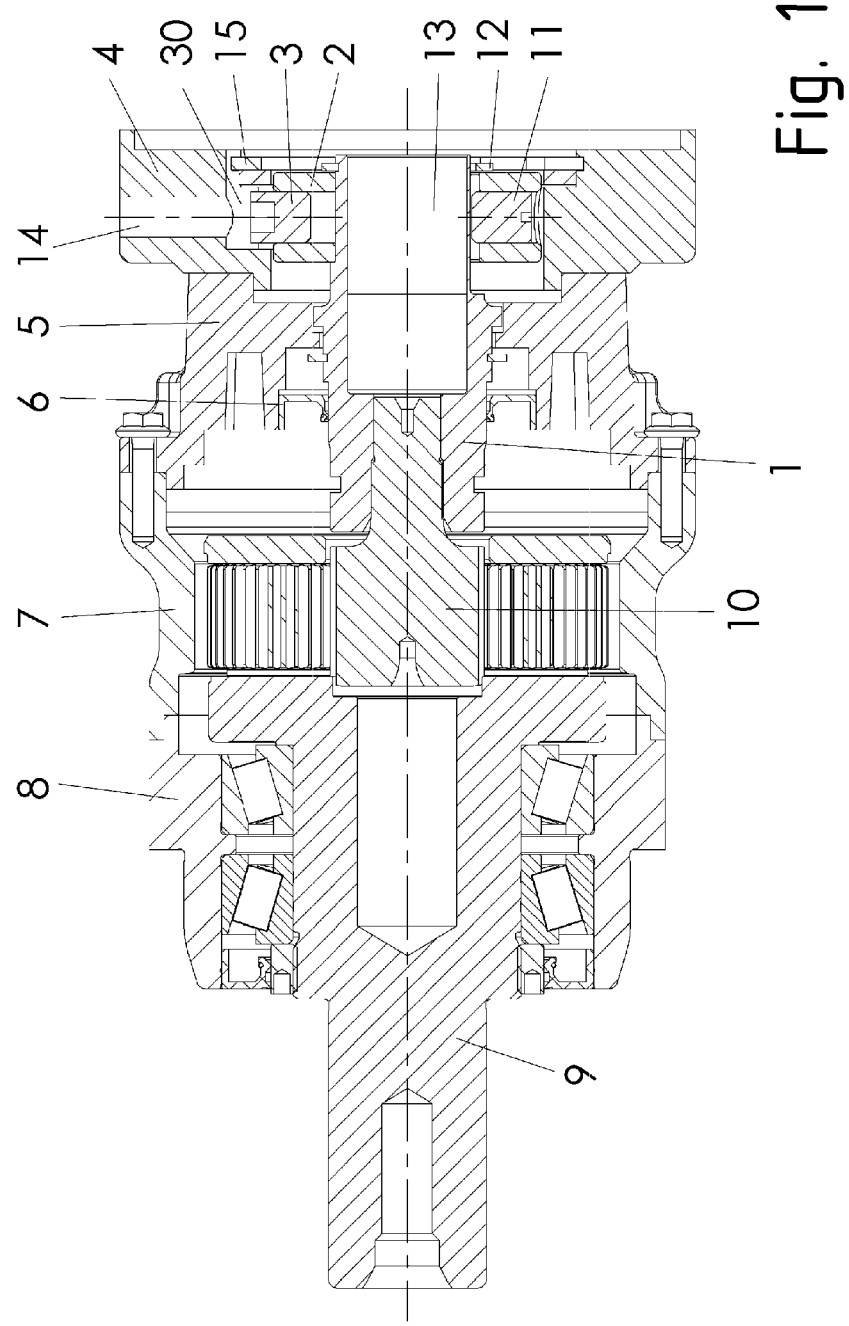
FIG. 1 shows a sectional view of an adapter according to the present invention, which is connected to a gear unit.
Figure 2:
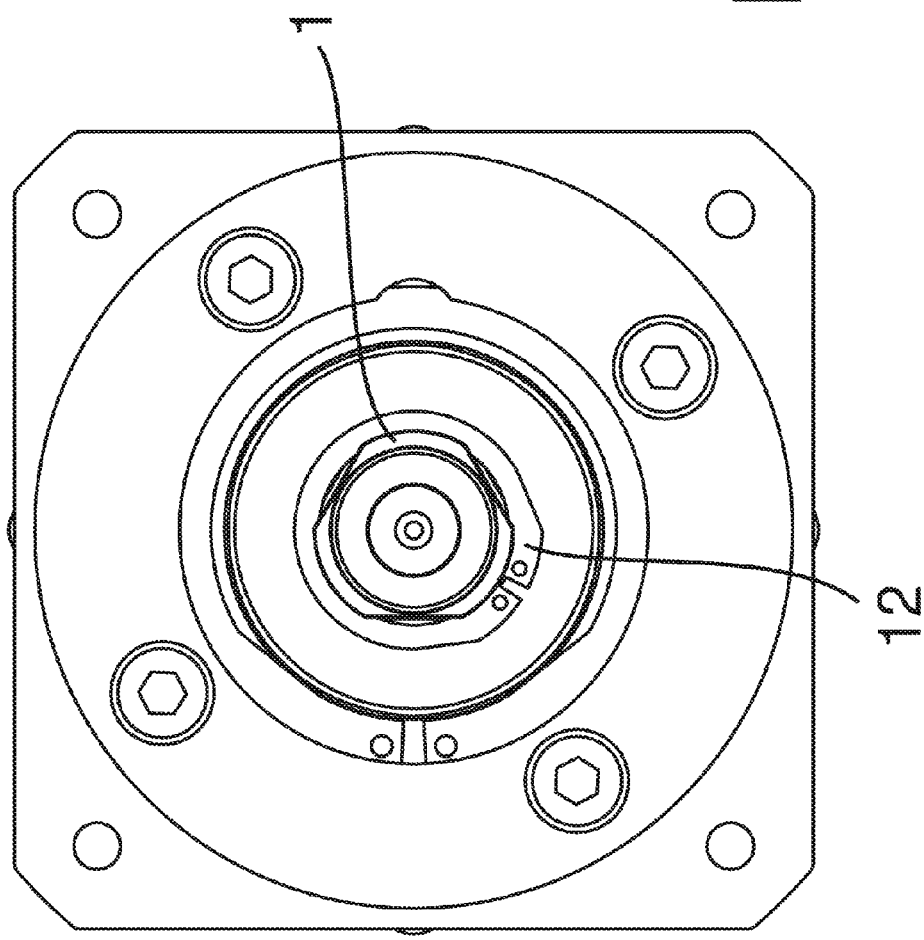
FIG. 2 shows an associated front view.
Figure 3:
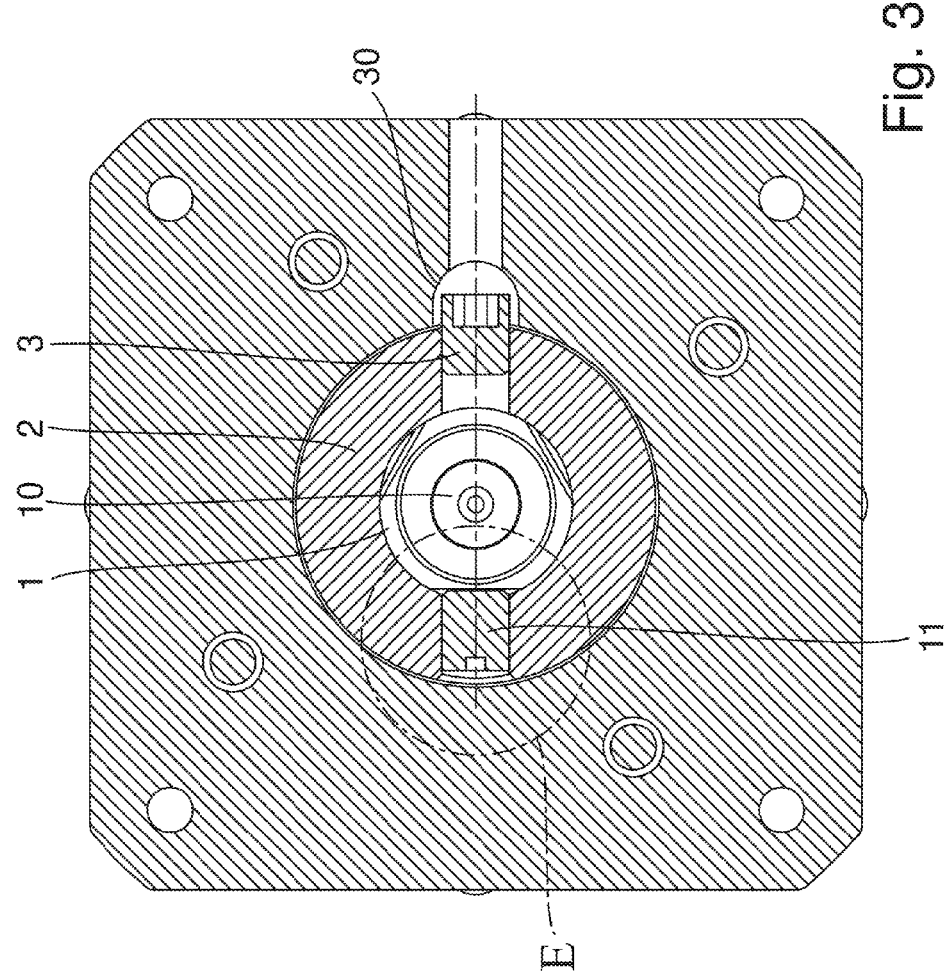
FIG. 3 shows a cross-section.
Figure 4:
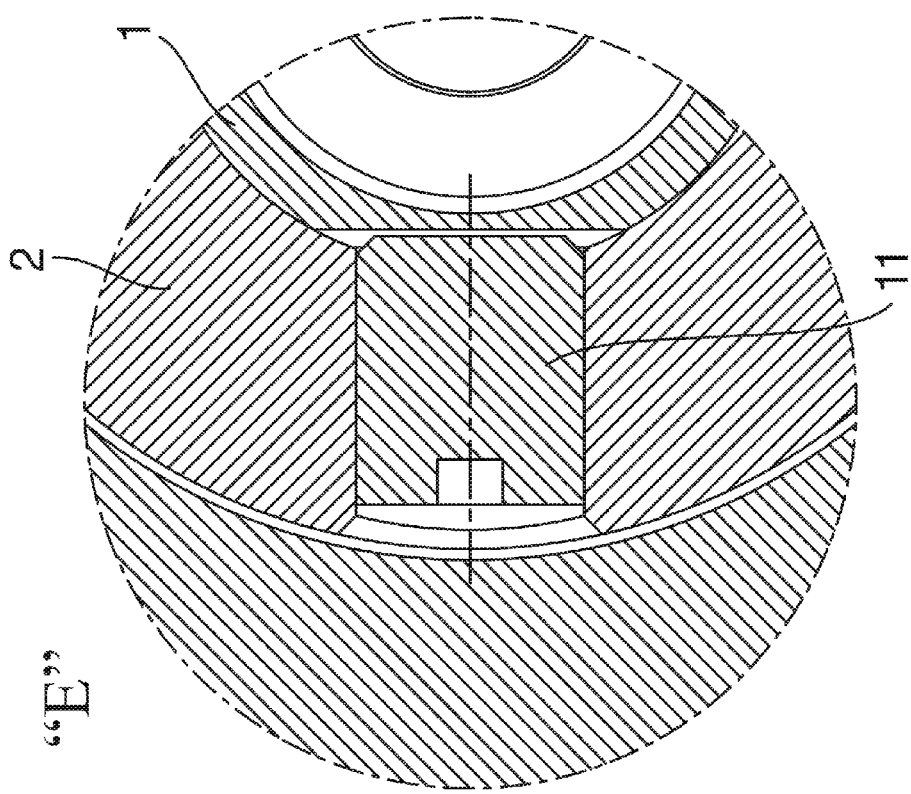
FIG. 4 shows a section belonging to FIG. 3, enlarged.

The adapter is disposed between an input electric motor, not shown in the figures, and a gear unit on the output side.

The motor housing is connected to adapter flange 4, and the rotor shaft of the motor is inserted into accommodation area 13 of adapter shaft 1 and clamped.

Adapter flange 4 is connected to adapter housing part 5, which in turn, is connected to gear housing part 7. On the output side, gear housing part 7 is connected to bearing flange 8, which accommodates the bearings of output shaft 9 of the gear unit.

Thus, adapter shaft 1 is supported in the motor housing via the rotor shaft. On the output side, a sun-wheel shaft 10 as input shaft of the gear unit is connected to adapter shaft 1 by a plug-in connection. To that end, the sun-wheel shaft is pressed with a pin that is cylindrical and knurled and/or has a serrated area, into a corresponding accommodation area of adapter shaft 1.

Adapter housing part 5 accommodates a shaft sealing ring 6, whose sealing lip seals against adapter shaft 1. Thus, the lubricating oil from the interior of the gear unit is sealed off with respect to the interior of the adapter.

The gear unit takes the form of a planetary gear, so that the sun-wheel toothing of sun-wheel shaft 10 engages with planet-wheel toothings, which in turn engage with toothing of an internal gear. The planets are supported on the planet carrier implemented as output shaft 9.

First setscrew 3 and further setscrew 11 are situated in the same axial area.

Adapter shaft 1 has three flattenings in this axial area, which are evenly spaced from each other in the circumferential direction. Owing to the uniform spacing of the three flattenings, a uniform force distribution is achieved. The rotor shaft of the motor is accommodated in accommodation area 13 of the adapter shaft by a force-locking connection, especially a clamping connection.

To that end, first setscrew 3 is screwed through a radial tapped hole in clamping ring 2, until it presses on adapter shaft 1. In this context, an angle of twist is provided between adapter shaft 1 and clamping ring 2, such that first setscrew 3 presses on an area which is located symmetrically in the circumferential direction between two of the flattenings of adapter shaft 1. Since the wall of adapter shaft 1 is thicker in this area than in the area of the flattenings, and therefore adapter shaft 1 becomes elastically deformed in the area of the thinned wall thickness, thus, in the area of the flattenings, this thicker area is pressed onto the motor shaft. Because of the acting pressure force of first setscrew 3, the two other thicker areas likewise disposed between respective flattenings in the circumferential direction are also pressed onto the motor shaft by the reaction forces formed. In this way, the shaft of the motor is clamped centrically. The reason is that because of the symmetrical placement of the flattenings, the three force pass-through areas formed at the circumference are likewise symmetrical.

The angle of twist between adapter shaft 1 and clamping ring 2 is ensured by further setscrew 11. To that end, prior to the connection of the motor shaft, thus, the rotor shaft of the motor, clamping ring 2 is slipped onto adapter shaft 1, and further setscrew 11 is screwed through a further tapped hole in clamping ring 2 until it contacts one of the flattenings of adapter shaft 1. In this manner, clamping ring 2 is locked against rotation relative to adapter shaft 1. It is not necessary that any high, radially acting pressure force be introduced by further setscrew 11 in order to attain this lock against rotation, which is why the area with thinned wall thickness assigned to the flattening is not subject to high forces. Further setscrew 11 only has the function of abutting against the flattening of the adapter shaft, and thus acting as anti-rotation means on the flattening.

To prevent the danger of mix-up, first setscrew 3 and further setscrew 11 have a different slot area for tools. For example, first setscrew 3 has a cross-recess slot area and the further setscrew has a slot area for a slot-head screwdriver.

Clamping ring 2 is slipped onto adapter shaft 1 coming from the axial direction and is inserted into adapter flange 4. First setscrew 3 projects radially outward from clamping ring 2. An axially running slot 30, especially an axial groove, is provided in adapter flange 4 to permit the insertion in adapter flange 4. At the inner end area of slot 30, which thus is incorporated in the inner wall of the accommodation area, a radially running borehole 14 opens through, through which a tool is able to be introduced in order to manipulate first setscrew 3. Thus, with the aid of setscrew 3 extending at least partially into slot 30, an anti-rotation lock of adapter shaft 1 is implemented in adapter flange 4 as transport restraint and storage safeguard. A retaining ring 12 is disposed on adapter shaft 1 to axially secure clamping ring 2 on adapter shaft 1.

A fixed zero-play adapting fitting is provided between the adapter and gear unit. Consequently, upon being connected to adapter flange 4, the motor housing is thus secured in position without play. It is not necessary to align the shaft, since during joining, the motor shaft is inserted into accommodation area 13 of adapter shaft 1, and the clamping connection is then activated with the aid of setscrew 3. Fast and easy production is thus achievable in this manner. In the same way, a fixed zero-play adapting fitting is also provided between adapter flange 4 and adapter housing part 5. Such a zero-play adapting fitting is likewise provided between the gear housing and adapter housing part 5. Therefore, the housing parts of the geared motor are thus able to be connected in fixed and zero-play manner, without an alignment being necessary. Advantageously, an alignment of adapter shaft 1 relative to the motor shaft may also be omitted.

Adapter shaft 1 is supported in statically determinate manner.

For the axial securing, especially for the axial positioning of clamping ring 2 when screwing in setscrew 3, a retaining ring 15 is disposed on adapter flange 4. To adjust for too large an opening in retaining ring 15, a supporting disk 50 is disposed axially next to retaining ring 15. This permits setscrew 3 to lean against supporting disk 50 while setscrew 3 is being screwed in. When the setscrew is already largely screwed in, but does not yet press sufficiently on the adapter shaft, the axial securing is admittedly no longer ensured by retaining ring 15 with supporting disk 50; however, the axial securing with play with the aid of retaining ring 52 on adapter shaft 1 together with shaft shoulder 51 of adapter shaft 1 is then still effective.

Figure 5:
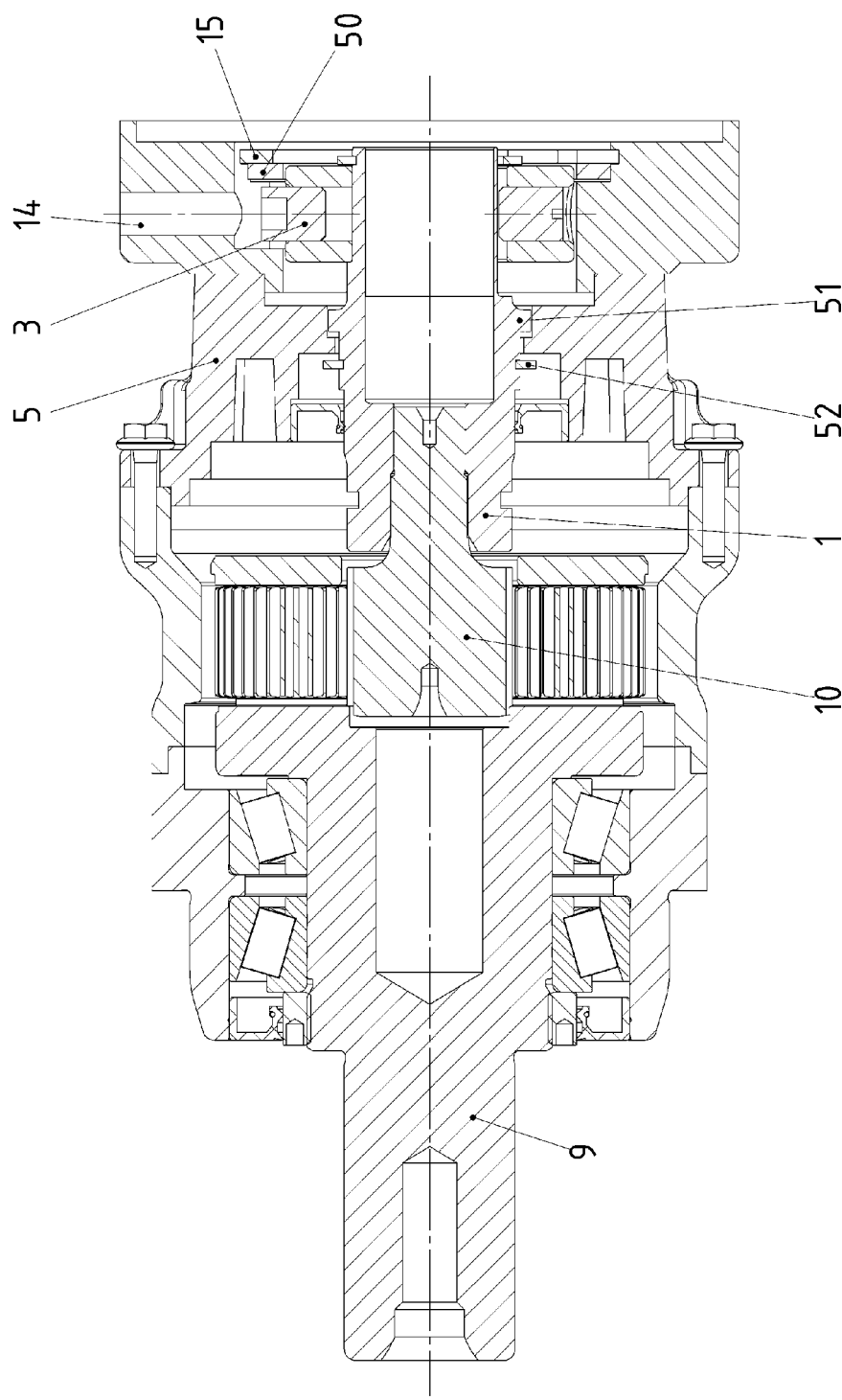
FIG. 5 shows a longitudinal section corresponding to FIG. 1 for a similar exemplary embodiment, in which, however, instead of further setscrew 11, a setscrew having threaded section 71 is screwed into clamping ring 73, a radially inwardly projecting pin section 72 being provided on the setscrew, with which the protection against rotation as well as the axial fixation on the adapter shaft are accomplished.
Figure 6:
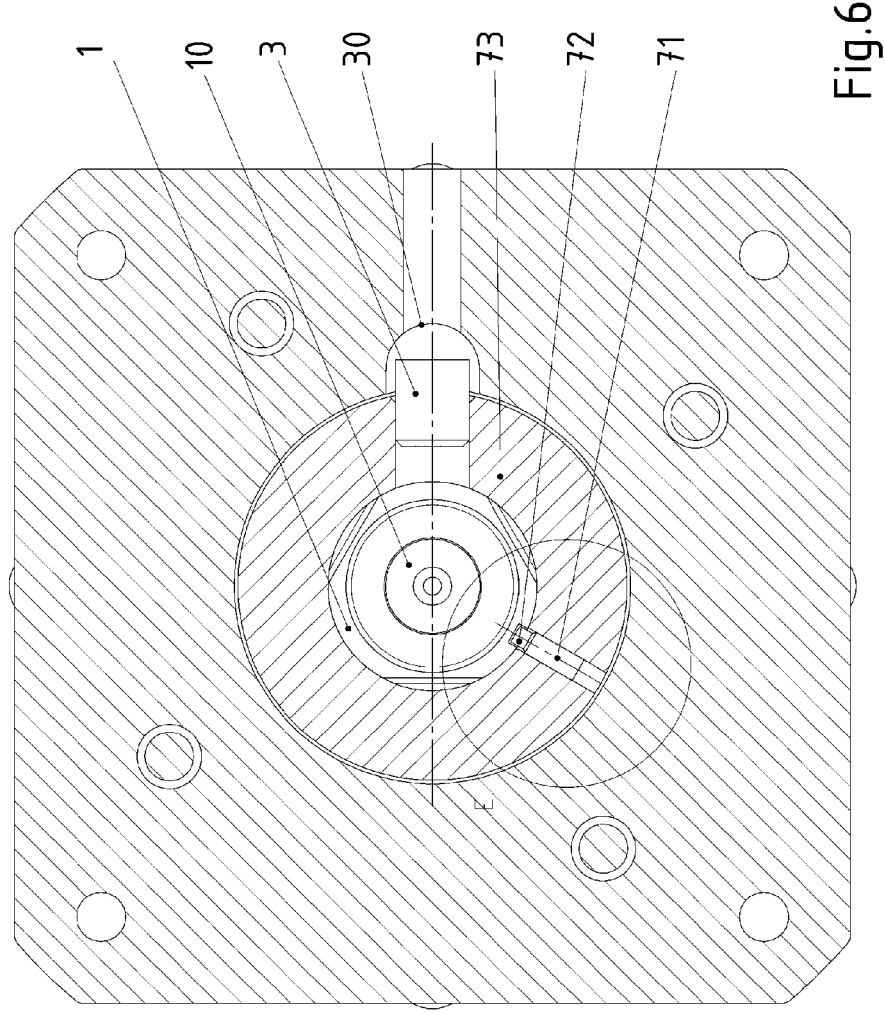
FIG. 6 shows an associated cross-section.
Figure 7:
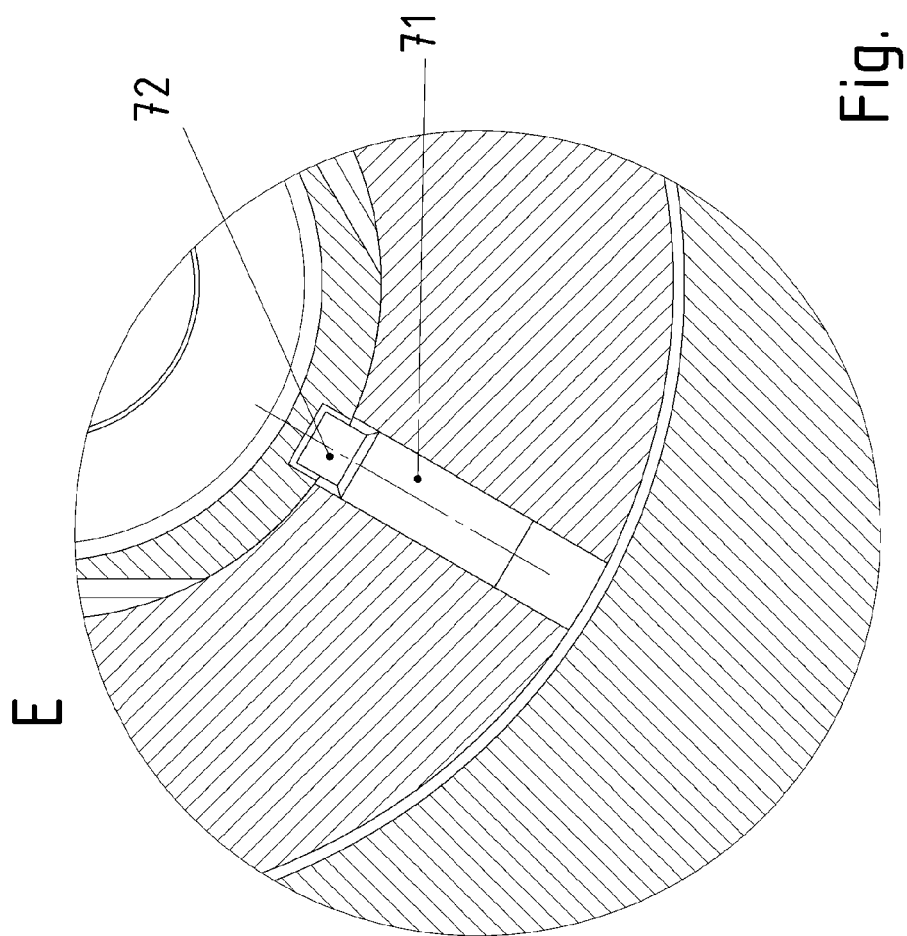
FIG. 7 shows a section from FIG. 6, enlarged.

As shown in FIG. 5 and FIG. 1, the axial restriction and thus also securing of adapter shaft 1 is achieved by the fact that a narrowing of adapter housing part 5 is located between a retaining ring 52 disposed on adapter shaft 1 and a shaft shoulder 51 formed on adapter shaft 1.

Instead of the planetary gear indicated, any other gear is also usable according to the present invention. Therefore, the invention is also practicable quite generally with respect to a shaft/hub connection, adapter shaft 1 being the hub and the motor shaft being the shaft to be connected.

In a further exemplary embodiment of the present invention, to instead adjust the diameter of the motor shaft indicated, thus, the rotor shaft, a sleeve is slipped onto the motor shaft and the motor shaft, together with the sleeve, is inserted into accommodation area 13 of the hub, especially of the adapter shaft.

In another exemplary embodiment of the present invention, instead of the motor and/or gear unit, other devices are connected to the adapter. In this case, the adapter shaft is again supported via the input shaft of the device used on the input side instead of the motor. Thus, instead of sun-wheel shaft 10, another shaft piece is also connectable to adapter shaft 1, and is supportable via it and the input shaft in the driving device.

In a further exemplary embodiment according to the present invention, instead of further setscrew 11 contacting a flattening, another type of protection against rotation is implemented. For example, clamping ring 2 is realized with a flat inner-wall section correspondent to the flattening of adapter shaft 1. Consequently, clamping ring 2 then abuts against adapter shaft 1, and the angle of twist is likewise ensured. Clamping ring 2 is also polygonal on its inner wall facing adapter shaft 1, or at least is implemented with flattenings evenly spaced from one another. Therefore, clamping ring 2 abuts at least in the area of one or more flattenings, and is locked against rotation relative to the adapter shaft.

In a further exemplary embodiment of the present invention, instead of further setscrew 11 contacting a flattening, a headless setscrew is screwed through a tapped hole in clamping ring 2, thus providing a lock against rotation. Therefore the headless setscrew then acts as anti-rotation means.

For the axial securing, especially for the axial positioning of clamping ring 2 upon screwing in setscrew 3, a retaining ring 15 is disposed on adapter flange 4.

LIST OF REFERENCE NUMERALS 1 adapter shaft
2 clamping ring
3 setscrew
4 adapter flange
5 adapter housing part
6 shaft sealing ring
7 gear housing part
8 bearing flange
9 output shaft
10 sun-wheel shaft
11 further setscrew
12 retaining ring
13 accommodation area
14 borehole for manipulation of setscrew 3
15 retaining ring on adapter flange 4
30 axial groove
50 supporting disk
51 shaft shoulder
52 retaining ring on adapter shaft 1
71 threaded section of the setscrew
72 pin section
73 clamping ring

What is claimed is:

1. A shaft/hub connection, comprising:
a hub; and
a shaft inserted into an accommodation area of the hub and connected into the accommodation area with force locking to achieve a force-locking connection, wherein:
the hub, at least in one axial area, has three flattenings evenly spaced from one another in a circumferential direction,
a first threaded part is screwed into a clamping ring and presses on one area of the hub in order to bring about the force-locking connection by elastic deformation of the hub at the flattenings to press against the shaft, and
the area against which the first threaded part presses covers an angle-at-circumference area that is smaller than an angular distance in the circumferential direction between two flattenings immediately adjacent in the circumferential direction.

2. The shaft/hub connection as recited in claim 1, wherein the shaft is a motor shaft.

3. The shaft/hub connection as recited in claim 1, wherein the hub is an adapter shaft.

4. The shaft/hub connection as recited in claim 1, wherein the force locking involves the shaft being clamped into the accommodation area.

5. The shaft/hub connection as recited in claim 1, wherein the first threaded part includes a first radially-acting setscrew.

6. The shaft/hub connection as recited in claim 1, wherein the force-locking connection is brought about by bracing of the clamping ring against the hub.

7. The shaft/hub connection as recited in claim 1, wherein the flattenings are situated on an outer side of the hub facing away from the shaft.

8. The shaft/hub connection as recited in claim 1, wherein the clamping ring is joined in a rotatably fixed manner to the hub.

9. The shaft/hub connection as recited in 8, wherein the flattenings are situated between the clamping ring and the hub.

10. The shaft/hub connection as recited in claim 1, wherein the area in the circumferential direction is situated centrally between two of the flattenings.

11. The shaft/hub connection as recited in claim 10, wherein the area in the circumferential direction is away from the axial area covered axially by the flattenings.

12. The shaft/hub connection as recited in claim 1, wherein a wall thickness of the hub is greater in the area in the circumferential direction that in the area of a respective flattening.

13. The shaft/hub connection as recited in claim 1, further comprising:
an anti-rotation means provided on the clamping ring and including one of a further threaded part, a flattening corresponding to at least one of the flattenings of the hub, and a planar inner-wall section corresponding to at least one of the flattenings of the hub.

14. The shaft/hub connection as recited in claim 13, wherein the anti-rotation means safeguards against rotation between the clamping ring and the hub.

15. The shaft/hub connection as recited in claim 13, wherein a slot area for manipulation of the first threaded part is implemented differently from a slot area for manipulation of the anti-rotation means, so that a different tool is necessary to manipulate the first threaded part than to manipulate the anti-rotation means.

16. The shaft/hub connection as recited in claim 15, wherein the first threaded part includes a first setscrew and the anti-rotation means includes a further setscrew.

17. The shaft/hub connection as recited in claim 15, wherein the first threaded part includes an internal hexagon for manipulation by a tool, and the anti-rotation means includes a slot for manipulation by a tool.

18. The shaft/hub connection as recited in claim 1, further comprising an anti-rotation means provided on the clamping ring and including a further threaded part, wherein the further threaded part includes one of a setscrew and a headless setscrew.

19. The shaft/hub connection as recited in claim 1, further comprising an anti-rotation means provided on the clamping ring and including a further threaded part, wherein the anti-rotation means is located diametrically opposite of the first threaded part, so that a center of mass of the first threaded part and a center of mass of the further threaded part are 180° away from each other in the circumferential direction.

20. The shaft/hub connection as recited in claim 1, further comprising an anti-rotation means provided on the clamping ring and including a further threaded part, wherein the further threaded part is adhesively bonded to the clamping ring.

21. The shaft/hub connection as recited in claim 1, wherein, as an anti-rotation means, the clamping ring includes a flattening on an inner wall of the clamping ring facing the hub.

22. The shaft/hub connection as recited in claim 21, wherein the flattening located on the inner wall of the clamping ring touches one of the flattenings of the hub and covers the same angle at circumference as the flattening of the hub.

23. The shaft/hub connection as recited in claim 1, wherein the hub is disposed radially between the shaft and the clamping ring.

24. The shaft/hub connection as recited in claim 1, further comprising:
a retaining ring for axially securing the clamping ring, the retaining ring being disposed on the hub.

25. The shaft/hub connection as recited in claim 1, wherein the first threaded part is provided in an accommodating housing part as one of a transport restraint and an anti-rotation means of the clamping ring acting in the circumferential direction.

26. The shaft/hub connection as recited in claim 25, wherein the accommodating housing part includes an adapter flange.

27. The shaft/hub connection as recited in claim 25, wherein the one of the transport restraint and the anti-rotation means acts in a restricting fashion.

28. The shaft/hub connection as recited in claim 1, wherein at least one of:
the hub, together with the clamping ring, is supported via the shaft in a housing part, and
the clamping ring is secured in position on the hub by an anti-rotation means in such a way that the first threaded part is pressed against the hub centrally in the circumferential direction between two adjacent flattenings.

29. The shaft/hub connection as recited in claim 28, wherein the housing part includes a motor housing part.

30. The shaft/hub connection as recited in claim 1, wherein the clamping ring is slipped onto the hub from an axial direction, so that the hub is able to be clamped onto the shaft.

31. The shaft/hub connection as recited in claim 30, wherein an axially running slot is provided in one housing part, into which the first threaded part extends at least partially as an anti-rotation transport restraint.

32. An adapter, comprising:
a shaft/hub connection, including:
a hub; and
a shaft inserted into an accommodation area of the hub and connected into the accommodation area with force locking to achieve a force-locking connection, wherein:
the hub, at least in one axial area, has three flattenings evenly spaced from one another in a circumferential direction,
a first threaded part is screwed into a clamping ring and presses on one area of the hub in order to bring about the force-locking connection by elastic deformation of the hub at the flattenings to press against the shaft,
the area against which the first threaded part presses covers an angle-at-circumference area that is smaller than an angular distance in the circumferential direction between two flattenings immediately adjacent in the circumferential direction,
the shaft/hub connection is surrounded at least partially by at least one of (a) the adapter flange including an axially running slot into which the first threaded part extends at least partially to form at least one of a transport restraint and a borehole opening through into the slot, a tool being passable through the borehole in order to manipulate the first threaded part, and (b) an adapter housing part.

33. The adapter as recited in claim 32, wherein the first threaded screw is manipulated by screwing.

34. A geared motor, comprising:
an adapter, comprising:
a shaft/hub connection, including:
a hub; and
a shaft inserted into an accommodation area of the hub and connected into the accommodation area with force locking to achieve a force-locking connection by elastic deformation of the hub at the flattenings to press against the shaft, wherein:
the hub, at least in one axial area, has three flattenings evenly space from one another in a circumferential direction,
a first threaded part is screwed into a clamping ring and presses on one area of the hub in order to bring about the force-locking connection,
the area against which the first threaded part presses covers an angle-at-circumference area that is smaller than an angular distance in the circumferential direction between two flattenings immediately adjacent in the circumferential direction,
the shaft/hub connection is surrounded at least partially by at least one of (a) an adapter flange, including an axially running slot into which the first threaded part extends at least partially to form at least one of a transport restraint and a borehole opening through into the slot, a tool being passable through the borehole in order to manipulate the first threaded part, and (b) an adapter housing part,
a zero-play adapting fitting is provided between a motor housing and at least one of an adapter flange and an adapter housing part, and
the zero-play adapting fitting is provided between a gear housing and at least one of the adapter flange and the adapter housing part.

* * * * *